(12) United States Patent
Whitney et al.

(10) Patent No.: US 10,060,468 B2
(45) Date of Patent: Aug. 28, 2018

(54) ADJUSTMENT COUPLER FOR AWNING HAVING ARTICULATED SUPPORT ARM

(71) Applicant: LIPPERT COMPONENTS, INC., Elkhart, IN (US)

(72) Inventors: Evan Whitney, Edwardsburg, MI (US); Samual Evans, Granger, IN (US); Marcus Montie, Granger, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 427 days.

(21) Appl. No.: 15/015,718

(22) Filed: Feb. 4, 2016

(65) Prior Publication Data

US 2016/0222671 A1 Aug. 4, 2016

Related U.S. Application Data

(60) Provisional application No. 62/111,928, filed on Feb. 4, 2015.

(51) Int. Cl.
| | |
|---|---|
| *E04H 15/08* | (2006.01) |
| *F16C 11/04* | (2006.01) |
| *E04F 10/06* | (2006.01) |
| *F16C 11/10* | (2006.01) |

(52) U.S. Cl.
CPC ........ *F16C 11/045* (2013.01); *E04F 10/0614* (2013.01); *E04F 10/0651* (2013.01); *E04F 10/0666* (2013.01); *F16C 11/10* (2013.01); *Y10T 403/32262* (2015.01); *Y10T 403/32361* (2015.01)

(58) Field of Classification Search
CPC ..... Y10T 403/32319; Y10T 403/32327; Y10T 403/32361; Y10T 403/32426; Y10T 403/32442; E04F 10/0637; E04F 10/0651; F16C 11/045
See application file for complete search history.

(56) References Cited

U.S. PATENT DOCUMENTS

| | | | | |
|---|---|---|---|---|
| 3,583,734 | A * | 6/1971 | Magi | B60R 1/0617 16/332 |
| 4,929,113 | A * | 5/1990 | Sheu | F16C 11/045 403/157 |
| 5,123,768 | A * | 6/1992 | Franklin | A46B 5/0075 403/84 |
| 5,581,838 | A * | 12/1996 | Rocco | A46B 5/0075 132/309 |
| 6,848,344 | B2 * | 2/2005 | Rocco | B25G 1/063 403/91 |
| 7,591,604 | B2 * | 9/2009 | Roberts | B25F 5/02 16/326 |
| 7,682,099 | B2 * | 3/2010 | Cole | B25F 1/04 192/69.91 |
| 8,342,482 | B2 * | 1/2013 | Smith | B66F 15/00 254/131.5 |

* cited by examiner

*Primary Examiner* — Jonathan P Masinick
(74) *Attorney, Agent, or Firm* — Barnes & Thornburg LLP

(57) ABSTRACT

An adjustment coupler includes a first clutch member and a second clutch member. In embodiments, the first clutch member may be rotationally fixed with respect to the second clutch member when a torque applied thereto is less than a predetermined amount. When the torque is greater than or equal to the predetermined amount, the first clutch member may rotate with respect to the second clutch member. In other embodiments, the first clutch member may be rotationally fixed to the second clutch member.

18 Claims, 11 Drawing Sheets

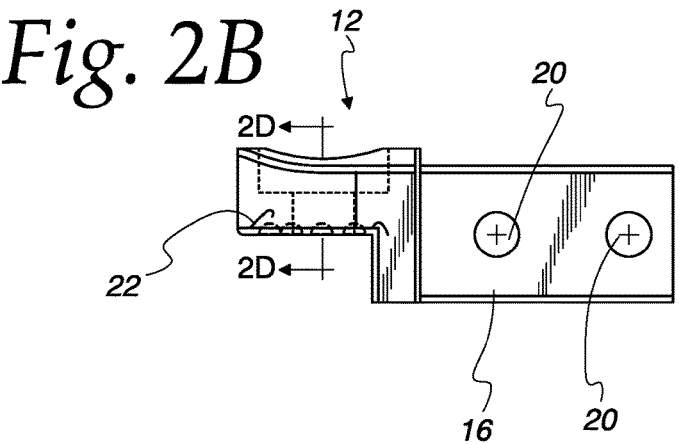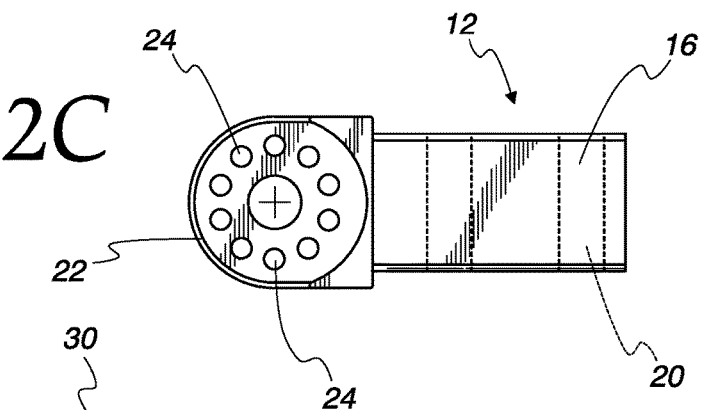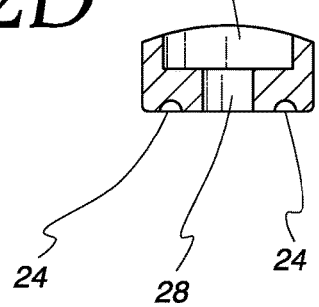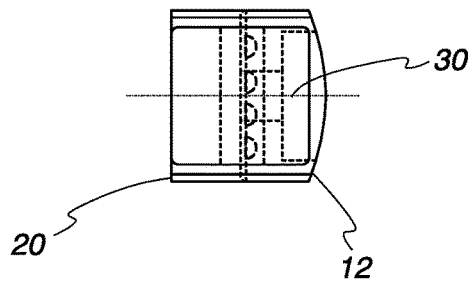

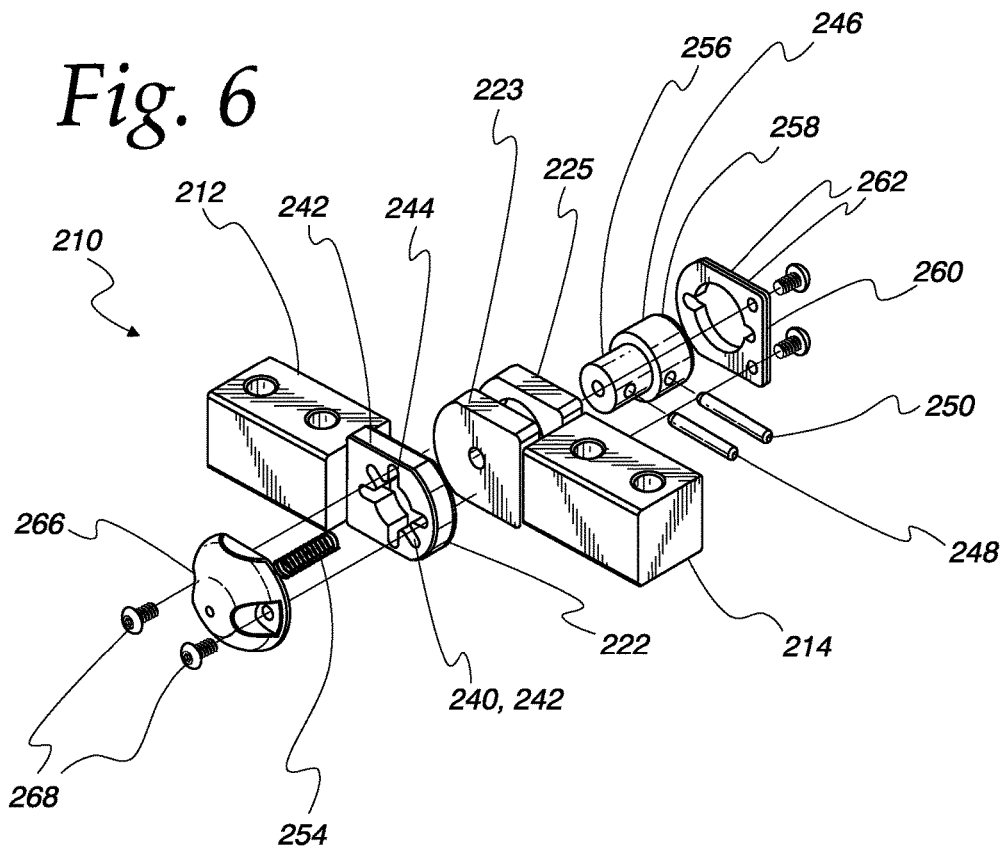
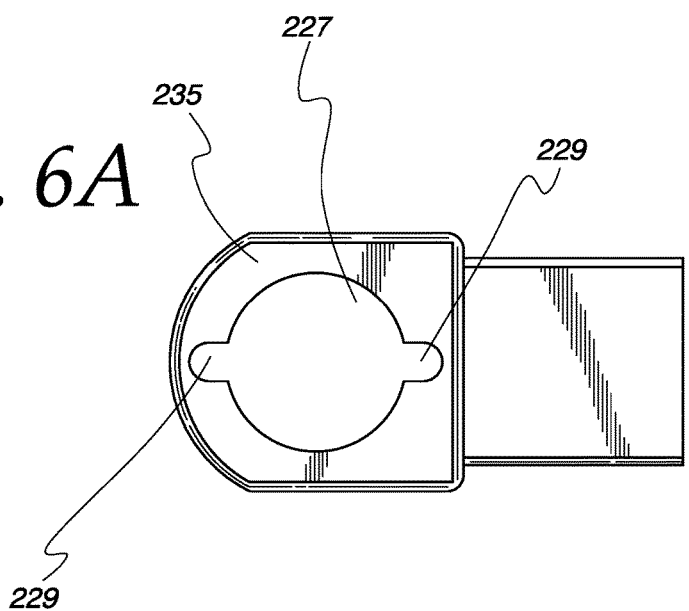

ADJUSTMENT COUPLER FOR AWNING HAVING ARTICULATED SUPPORT ARM

CROSS REFERENCE TO RELATED APPLICATIONS

This application claims benefit of U.S. Provisional Patent Application No. 62/111,928, filed on Feb. 4, 2015, and incorporates by reference the disclosure thereof in its entirety.

BACKGROUND AND SUMMARY OF THE DISCLOSURE

This disclosure relates to retractable awnings and, more particularly, to retractable awnings having one or more articulated support arms configured to allow varying the pitch of the awning fabric, for example, to facilitate dumping accumulated water from the awning fabric. Such awnings may be used, for example, on recreational vehicles. Examples of such awnings include, without limitation, those disclosed in U.S. Pat. No. 8,752,606 ("the '606 patent") and U.S. patent application Ser. No. 14/527,234 ("the '234 application"), the disclosures of which are incorporated herein by reference in their entireties. The '606 patent and the '234 application are commonly owned by the assignee of this disclosure and the subject matter described therein.

In awnings having one or more articulated support arms, the articulated support arm(s) may include first and second arm elements that are adjustable relative to one another and are joined by an adjustment coupler. The adjustment coupler may simply comprise a nut and bolt. The nut and bolt may be adjusted to apply a predetermined force to the interface between the first and second arm elements, thereby establishing sufficient friction there between to maintain the first and second arm elements in a particular orientation relative to each other when a torque applied thereto is less than a predetermined amount, while allowing a user to manually articulate the first arm element with respect to the second arm element when a torque applied thereto is greater than a predetermined amount, without requiring the user to loosen and retighten the nut and bolt. In some embodiments, the adjustment coupler may further comprise a biasing mechanism, for example, a Belleville washer or compression spring, in combination with the nut and bolt such that the Belleville washer may apply a load to the joint. In further embodiments, the adjustment coupler may include a ball or toothed detent clutch. In yet another embodiment, the adjustment coupler comprise a mechanism lockable into any of several orientations, the mechanism being attached to the first and second arm elements and thereby able to selectively lock the first and second arm elements into any of several orientations with respect to each other.

BRIEF DESCRIPTION OF THE DRAWINGS

FIGS. 2A-2E are a set of detail views of a first member of the ball detent clutch adjustment coupler of FIG. 1.

FIG. 6 is an exploded perspective view of a lockable adjustment coupler;

DETAILED DESCRIPTION OF THE DRAWINGS

Figure 1:
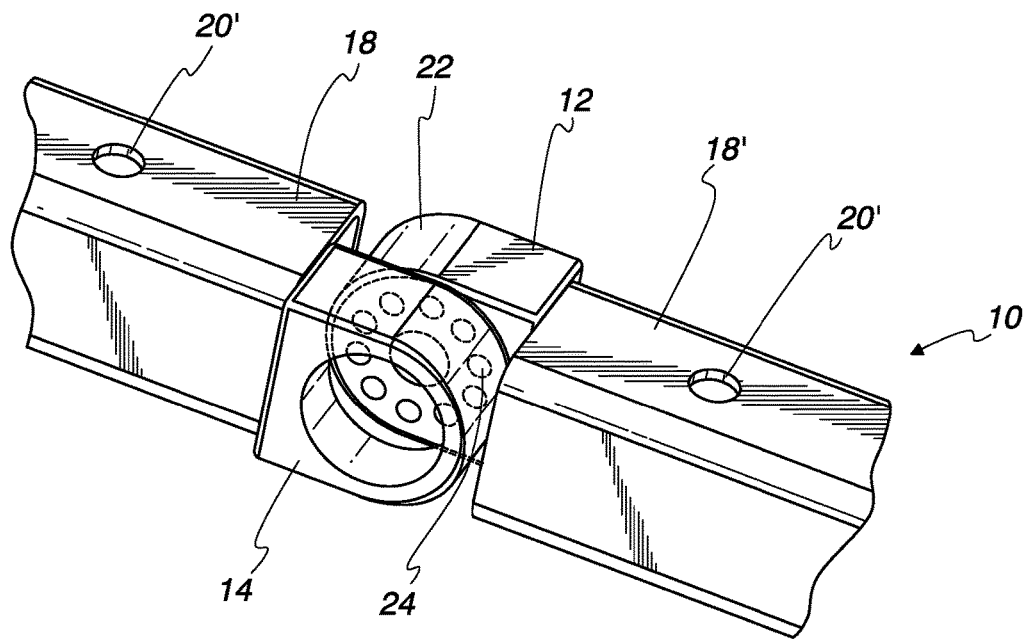
FIG. 1 is a partial cutaway perspective view of a ball detent clutch adjustment coupler mounted to first and second arm elements of an awning support arm.

The drawings show several illustrative embodiments of adjustment couplers that could be used in an articulated support arm of an awning support structure, for example, the awning support structures disclosed in the '606 patent and '234 application, among others. Dimensions shown in the drawings are illustrative and not limiting.

Figure 2A:
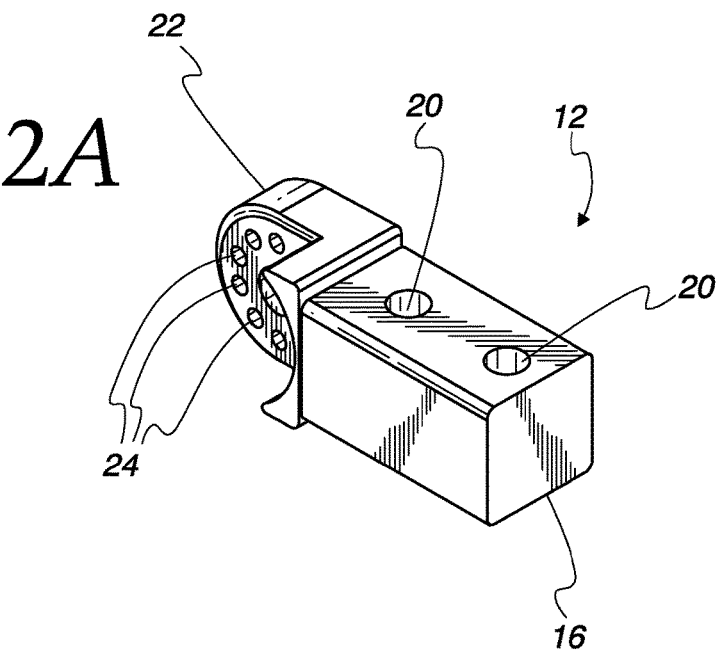

FIGS. 1 and 2 show an illustrative ball detent clutch adjustment coupler 10. The ball detent clutch coupler 10 includes a first clutch member 12 and a second clutch member 14. The second clutch member 14 may be identical to the first clutch member 12, except as may be noted below.

The first clutch member 12 includes a shank 16 configured to be inserted into an open end of a support arm member 18. The shank 16 may include one or more apertures 20 for receiving a pin or threaded fastener (not shown) that may be used to secure the shank to the support arm member 18. The support arm member 18 may include corresponding apertures 18' configured to receive such pins or threaded fasteners.

A detent head 22 extends from the shank 16. The detent head 22 has a surface into which a plurality of receptacles 24 is formed in a circular or semi-circular arrangement. The receptacles 24 may be blind holes, through holes, divots, depressions, cavities, or the like. Each receptacle 24 is sized to receive a portion of a respective ball bearing 26, for example, about half of the ball bearing 26 or more or less, but not the entirety of the ball bearing 26. It may be advantageous for the receptacles 24 of one of the first clutch member 12 and the second clutch member 14 to be deeper than and, therefore, configured to receive greater portions of the corresponding ball bearings 26 than the receptacles 24 of the other of the first clutch member 12 and the second clutch member 14 to facilitate operation of the coupler 10, as will become evident from the discussion below.

The end of the detent head 22 opposite the shank 16 has a curved profile so that the detent head can rotate with respect to a similar detent head of the adjoining second clutch member 14 through some range of rotation without interference from the detent head 16 of the second clutch member. As shown, the first clutch member 12 could rotate about 180 degrees or more with respect to the second clutch member 14 during operation of the coupler 10.

A bore 28 extends axially through the detent head 22, coaxial with the arrangement of receptacles 24. A counterbore 30 is coaxial with the bore 28. The counterbore 30 extends inwardly from a surface of the detent head 22 opposite the surface defining the receptacles 24.

With the ball bearings 26 disposed in the receptacles 24 of the detent head 22 of the first clutch member 12, the surface of the second clutch member 14 defining the receptacles 24 thereof may be placed in or near abutment with the corresponding surface of the first clutch member so that the receptacles 24 of the second clutch member 14 face and align with respective receptacles 24 of the first clutch member and thereby receive portions of the ball bearings 26 therein. A fastener, for example, a bolt (not shown but analogous to the bolt 132 discussed below) may be inserted through the respective bores 28 of the first clutch member 12 and the second clutch member 14. A nut (not shown but analogous to the nut 134 discussed below) may be threaded onto the shank of the bolt. The nut and the head of the bolt may be disposed, completely or partially, within the counterbores 30 of the second and first clutch members 14, 12, respectively. The counterbore 30 of one of the first clutch member 12 and the second clutch member 14 may be keyed to the nut or head of the bolt received therein to preclude the nut or bolt head from turning freely therein. A Belleville washer (not shown but analogous to the Belleville washer 136 discussed below) may be disposed between the nut (or the bolt head) and the inner surface of the counterbore 30 surrounding the bore 28. The Belleville washer may serve to bias opposing faces of the first clutch member 12 and the second clutch member 14 toward or against each other. Another form of biasing member, for example, a compression spring bearing between the nut or bolt head and the counterbore 30 of the first clutch member 12 or the second clutch member 14, could be provided in lieu of the Bellville washer to accomplish this purpose.

In use, the nut and bolt may be tightened such that the Belleville washer (or other biasing mechanism) biases the detent head 22 of the first clutch member 12 toward the detent head of the second clutch member 14 with sufficient force to preclude rotation of the first clutch member 12 with respect to the second clutch member 14 when a torque lower than a predetermined threshold amount is applied thereto, and to allow rotation of the first clutch member 12 with respect to the second clutch member 14 when a torque greater than a predetermined threshold amount is applied thereto. The greater-than-threshold torque causes sufficient compression or flattening of the Belleville washer to permit the first clutch member 12 move sufficiently axially from the second clutch member 14 so that the ball bearings 26 can be released from the receptacles 24 of one of the first and second clutch members, thereby permitting the first clutch member 12 to rotate with respect to the second clutch member 14. Once the first and second clutch members 12, 14 have rotated through a sufficient arc, the ball bearings 26 reengage with the receptacles 24 of the respective clutch members.

Figure 3A:
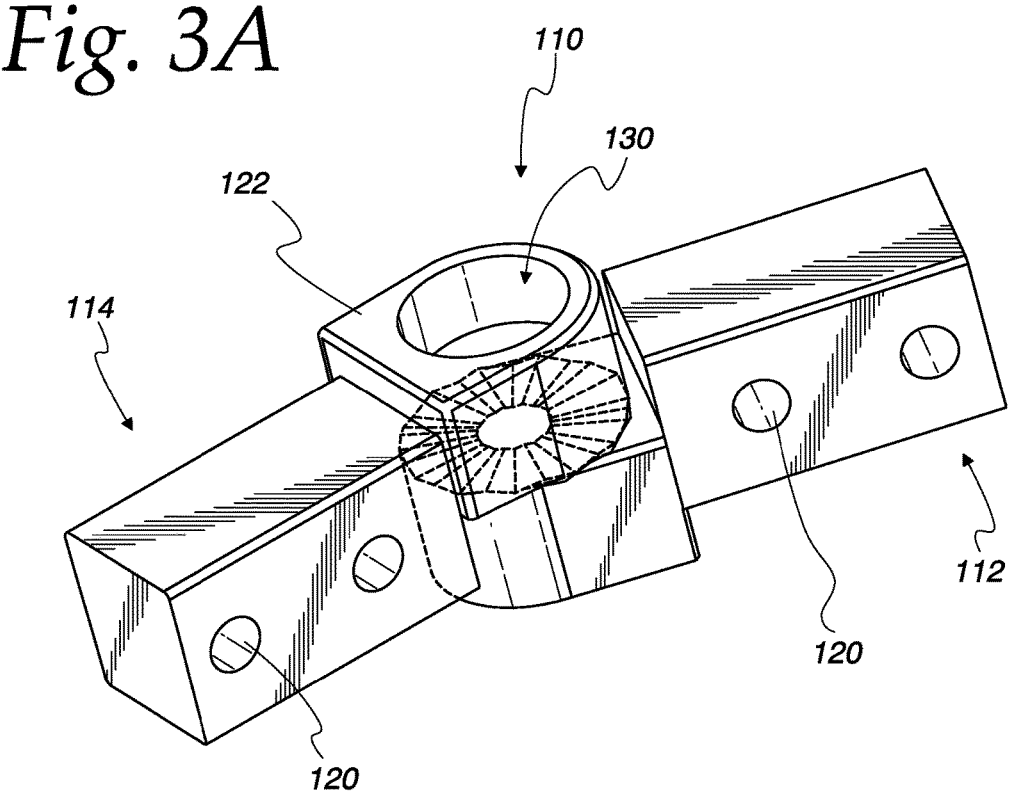
FIG. 3 is a partial cutaway exploded perspective view of a toothed detent clutch adjustment coupler.
Figure 3B:
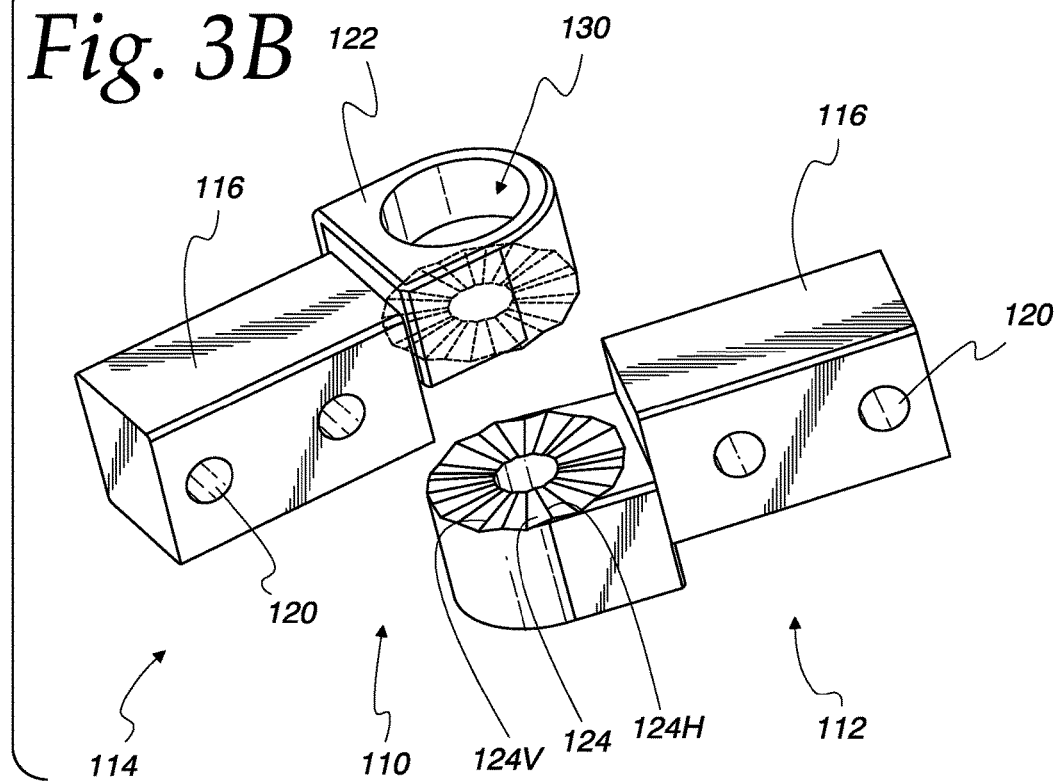
Figure 4:
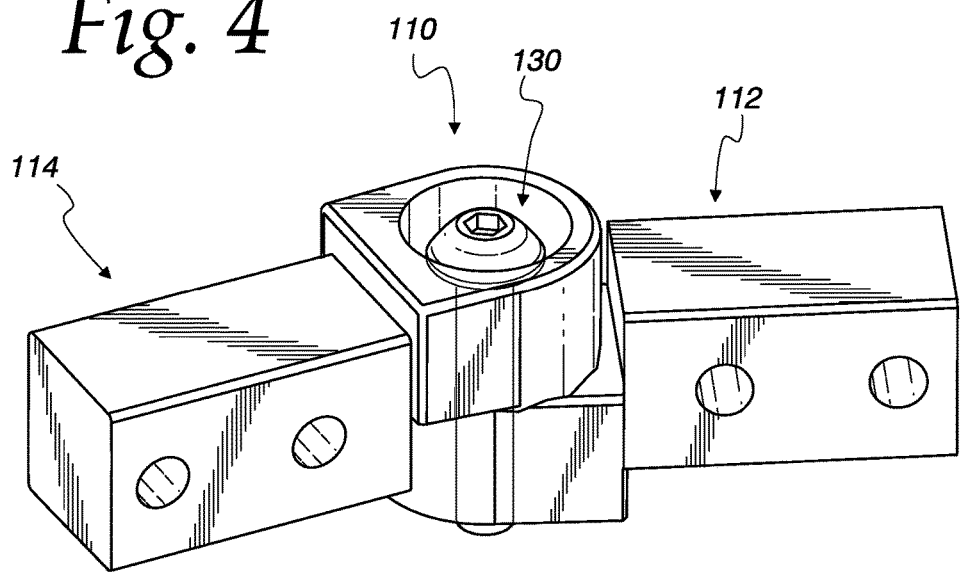
FIG. 4 is a partial cutaway exploded perspective view of the toothed detent clutch adjustment coupler of FIG. 3.
Figure 5:
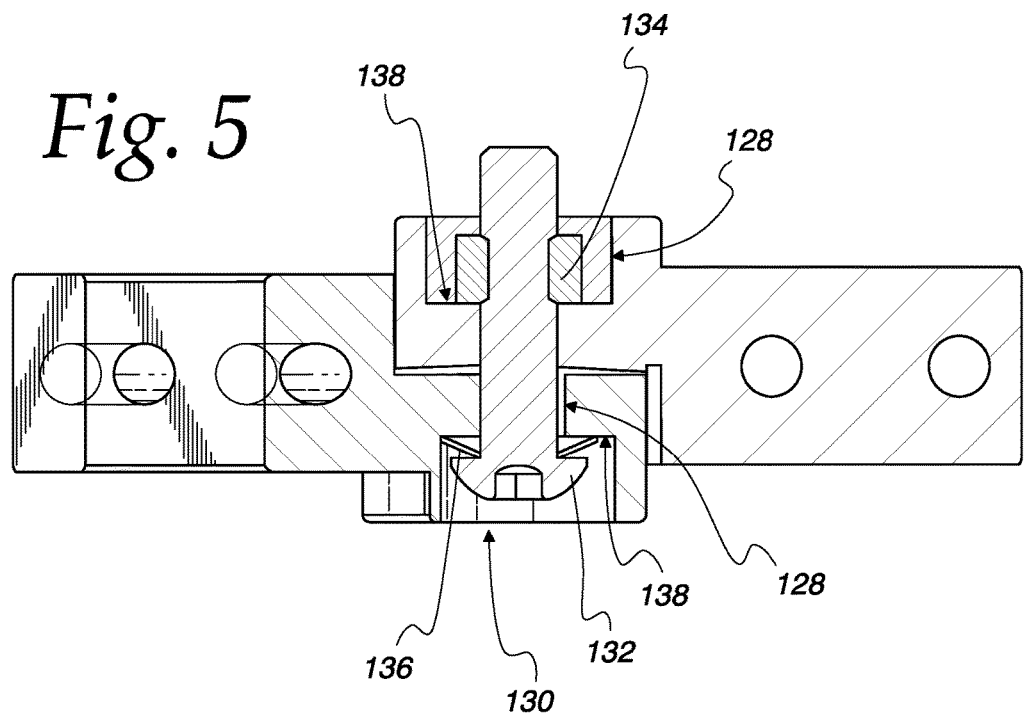
FIG. 5 is side cross-sectional view of the toothed detent clutch adjustment coupler of FIG. 3.
Figure 7:
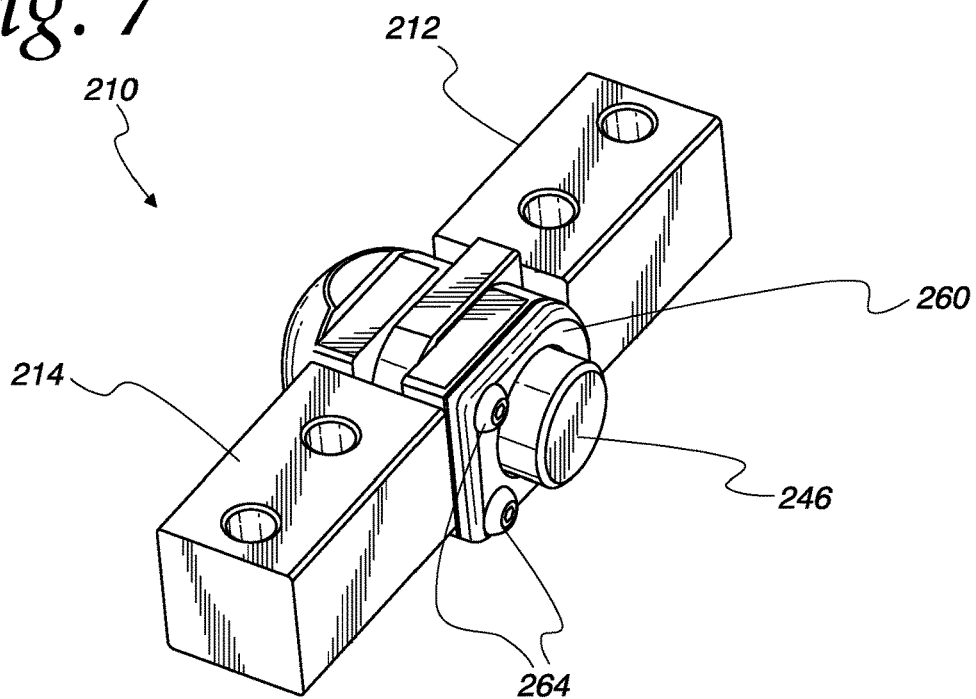
FIG. 7 is a perspective view of the adjustment coupler of FIG. 6.
Figure 8:
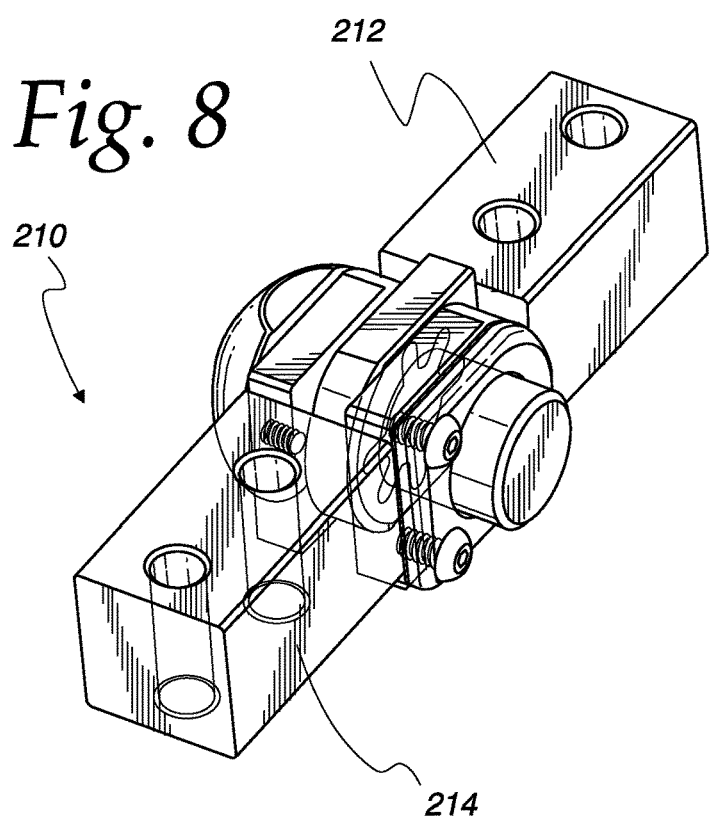
FIG. 8 is a partial cutaway perspective view of the adjustment coupler of FIG. 6.
Figure 9:
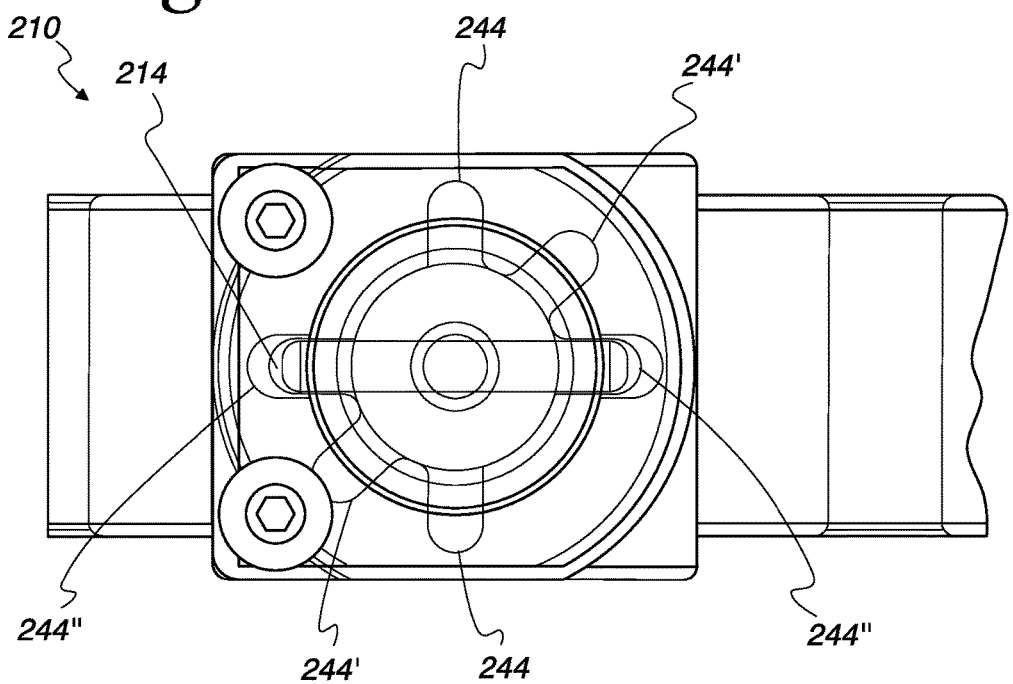
FIG. 9 is a side sectional view of the adjustment coupler of FIG. 6.
Figure 10:
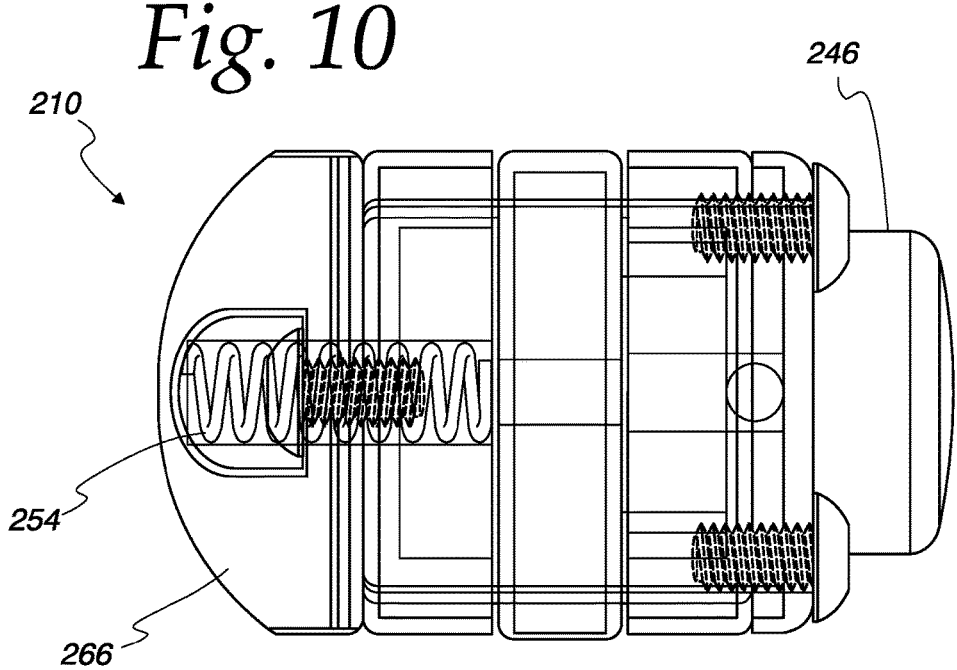
FIG. 10 is an end sectional view of the adjustment coupler of FIG. 6.
Figure 11:
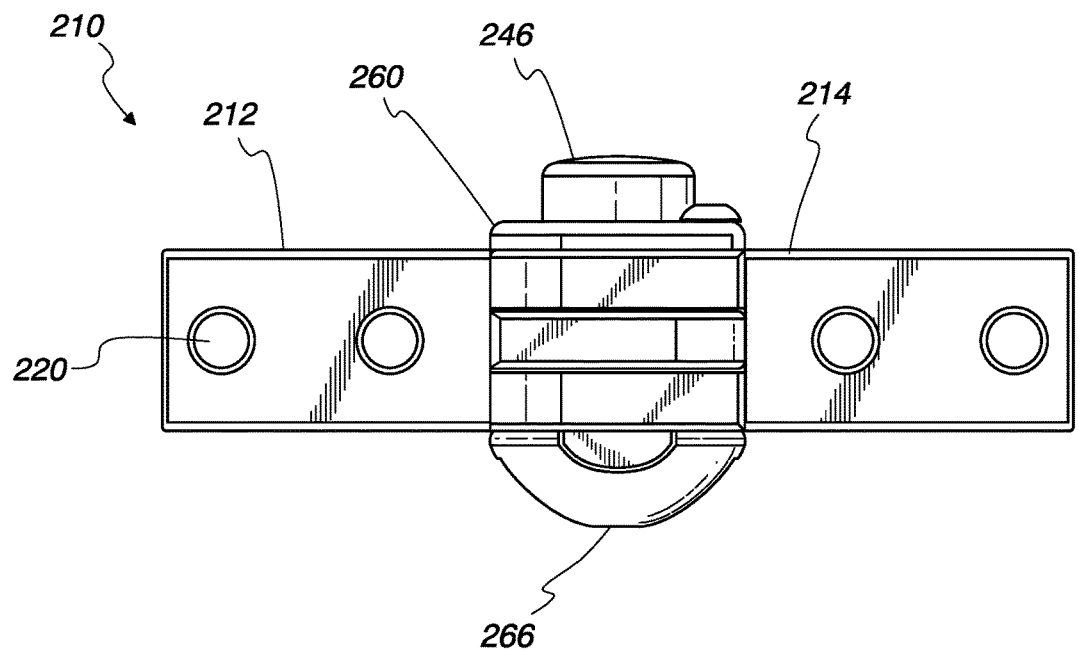
FIG. 11 is a top plan view of the adjustment coupler of FIG. 6.
Figure 12:
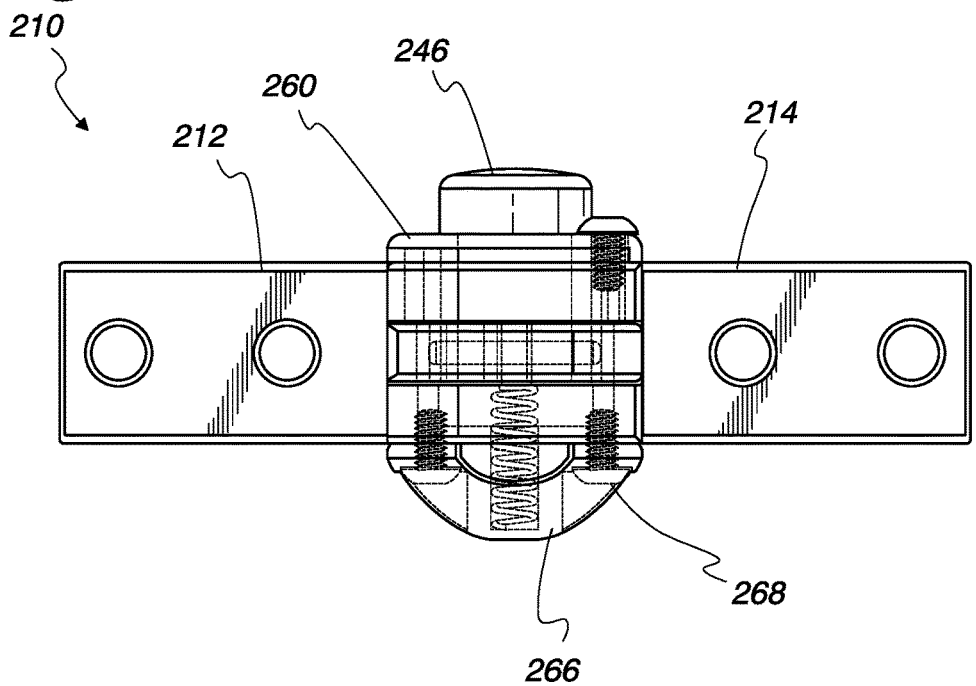
FIG. 12 is a partial cutaway top plan view of the adjustment coupler of FIG. 6.

FIGS. 3-5 show an illustrative second embodiment 110 of an adjustment coupler that is similar to the first embodiment 10 except that it uses a toothed interface instead of a ball bearing detent interface. In this regard, the detent heads 122 of the first and second clutch members 112, 114 have axially abutable surfaces each configured with a plurality of radially-arranged teeth 124 defining a plurality of radially-arranged hills and valleys 124H, 124V.

The surface of the second clutch member 114 defining the teeth 124 thereof may be placed in or near abutment with the corresponding surface of the first clutch member 112 so that the teeth 124 of the second clutch member 114 face the teeth 124 of the first clutch member and the hills 124H of the teeth 124 of one of the clutch members 112, 114 are received by the valleys 124V defined by the teeth of the other of the clutch members 114, 112. A fastener, for example, a bolt 132 may be inserted through the bores 128 of the first clutch member 112 and the second clutch member 114. A nut 134 may be threaded onto the shank of the bolt 132. The nut 134 and the head of the bolt 132 may be disposed, completely or partially, within the counterbores 130 of the second and first clutch members 114, 112, respectively. A Belleville washer 136 may be disposed between the nut 134 and the inner surface 138 of the counterbore 130 surrounding the bore 128.

Operation of the second embodiment 110 is similar to that of the first embodiment 10. When a torque greater than a threshold amount is applied to the first clutch member 112 with respect to the second clutch member 114, the Belleville washer 136 compresses or flattens sufficiently to permit the first clutch member 112 to move sufficiently axially from the second clutch member 114 so that the hills 124H of one of the first and second clutch members may ride over the hills 124H of the other of the first and second clutch members. When a lesser torque or no torque is applied to the first clutch member 112 with respect to the second clutch member 114, the Belleville washer 136 tensions the bolt 132 such that the hills 124H and valleys 124V of one of the first and second clutch members engage with the valleys and hills of the other of the first and second clutch members.

Both of the foregoing embodiments may be configured to allow an articulated support arm in which they are installed to self-straighten when the respective awning is collapsed. More specifically, they may be configured to maintain a first portion of an awning support arm connected to the first clutch member 12, 112 in a desired orientation with respect to a second portion of the support arm connected to the second clutch member 14, 114 while an awning supported by the support arm is in use. Upon retraction of the awning, a torque may be applied to the first and second portions of the support arm as the support arm is moved toward its stowed position, the torque being sufficient to rotate the first clutch member 12 with respect to the second clutch member 14 so as to allow the first and second portions of the support arm to achieve a generally straight configuration.

FIGS. 6-18 show an illustrative third embodiment of an adjustment coupler 210. The coupler 210 includes a first clutch member 212 and a second clutch member 214. Each of the first and second clutch members 212, 214 includes a shank 216 similar to the shank 16 of the first embodiment 10. The shank may include apertures 220 similar to apertures 20 of the first embodiment for receiving fasteners that may be used to fasten the shank to a corresponding support arm portion.

The first clutch member 212 includes a tab 222 extending longitudinally from the shank 216. The tab 222 has first and second opposing surfaces, and it defines an aperture 240 extending there through from the first surface to the second surface. The aperture 240 includes a central portion 242 configured to receive a cylindrical shaft of a locking member or push button 246, as will be discussed further below. The aperture 240 also includes keyways 244, 244', 244" extending radially outwardly beyond the perimeter of the central portion 242. Each of the keyways 244, 244', 244" is configured to selectively receive a corresponding key 248 extending from a locking member or pushbutton 246, as will be discussed further below. Each of the keyways 244, 244', 244" as shown in the drawings is configured as a generally linear slot. In other embodiments, the keyways could have other shapes. Also, each of the keyways 244, 244', 244" is shown in the drawings as comprising a pair of diametrically-opposed keyway portions extending from the central portion 242. In other embodiments, each of the keyways 244, 244', 244" could be embodied as a single keyway extending in one direction from the central portion 242.

The second clutch member 214 includes first and second tabs 223, 225 extending longitudinally from the shank 216. The first and second tabs 223, 225 are parallel to each other, and they cooperate to define a slot there between. The slot is configured to receive the tab 224 of the first clutch member 212.

The surface of the first tab 223 facing the second tab 225 includes a relief 231 configured to selectively receive an end of the pushbutton 246. The relief includes a keyway 231' configured to selectively receive the corresponding key 248 extending from the pushbutton 246, as will be discussed further below. The keyway 231' as shown in the drawings is configured as a slot. In other embodiments, the keyway 231' could have other shapes. Also, the keyway 231' is shown in the drawings as a pair of diametrically-opposed keyway portions extending from a central portion of the relief 231. In other embodiments, the keyway 231' could be embodied as a single keyway portion extending in one direction from the central portion of the relief 231. The first tab 223 also defines an aperture 252 axially there through configured to receive a spring 254, for example, a coil compression spring.

Figure 13:
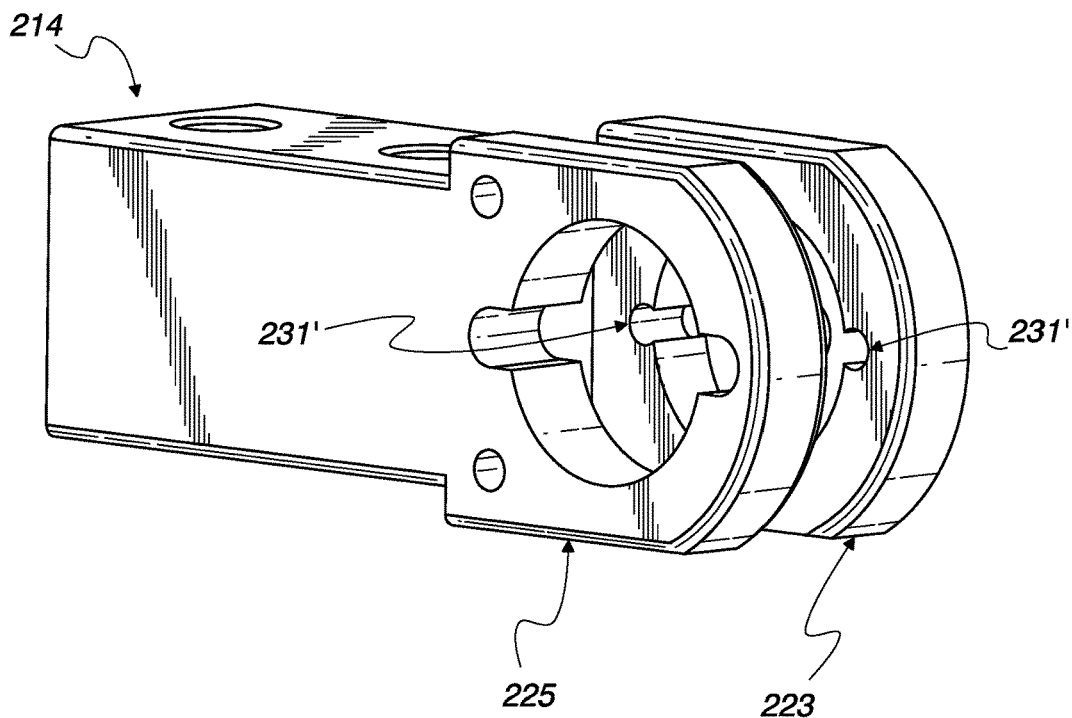
FIG. 13 is a perspective view of a second clutch member of the adjustment coupler of FIG. 6.
Figure 14:
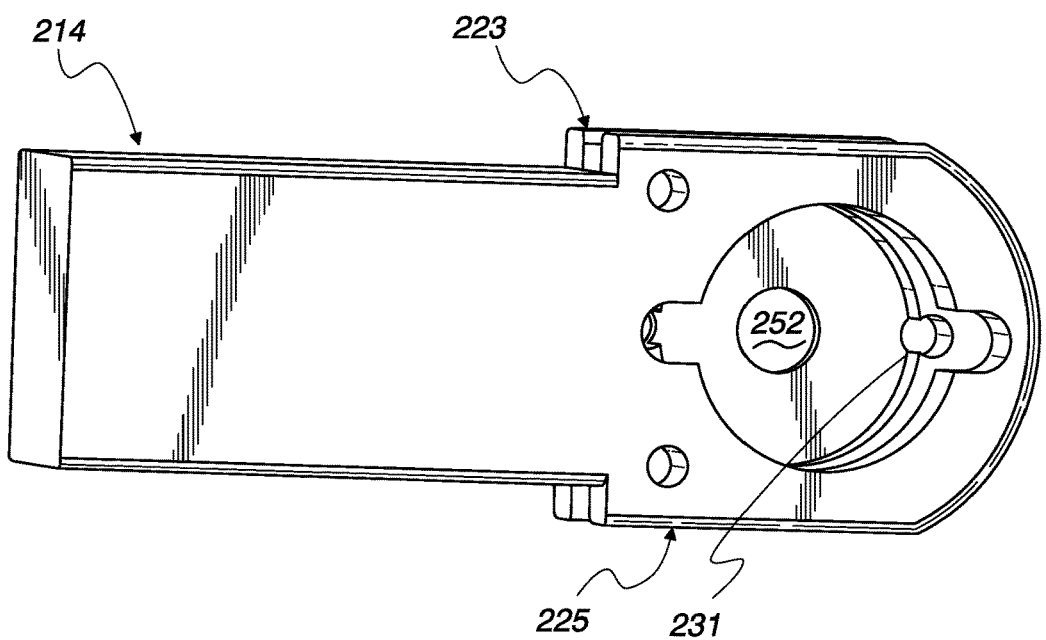
FIG. 14 is another perspective view of a second clutch member of the adjustment coupler of FIG. 6.
Figure 15:
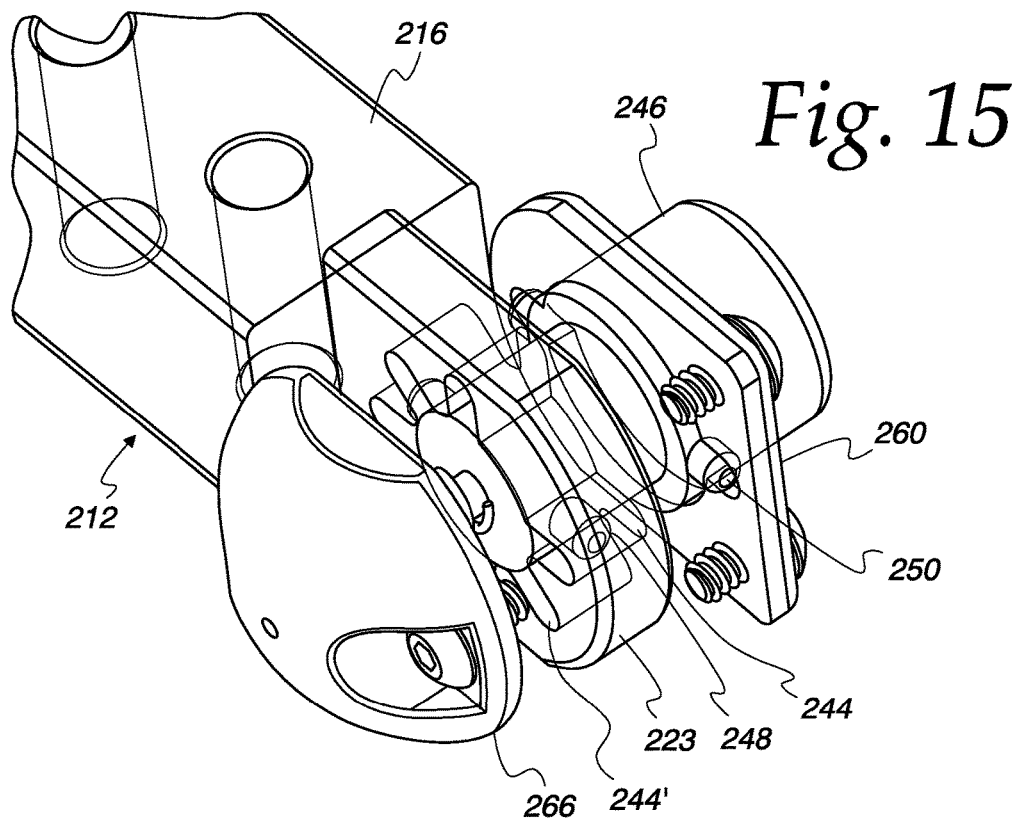
FIG. 15 is a partial cutaway perspective view of the adjustment coupler of FIG. 6 in a locked configuration.
Figure 16:
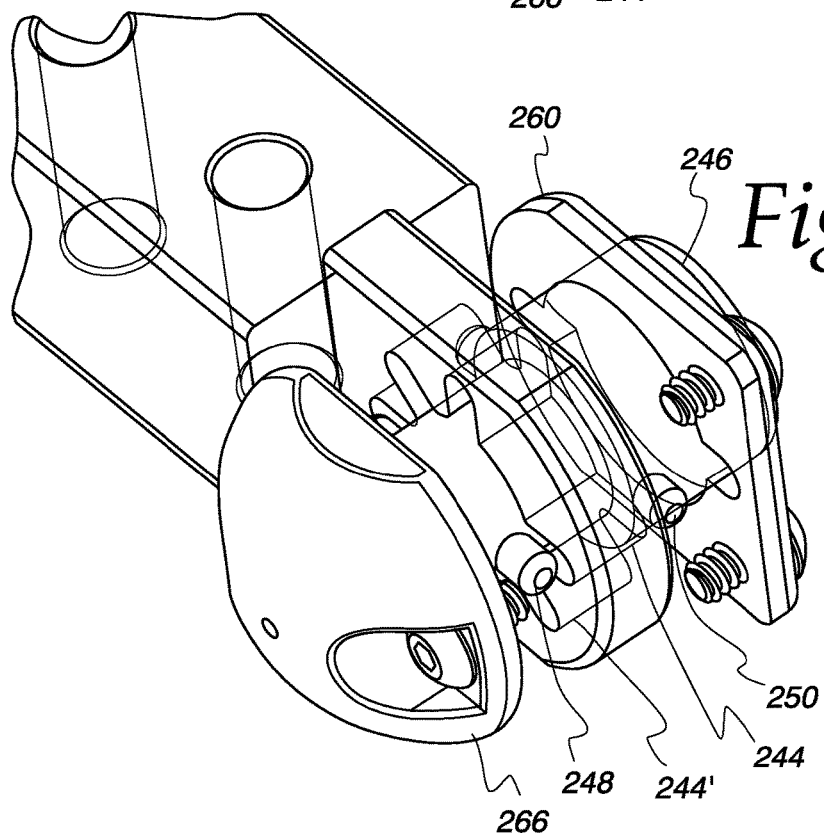
FIG. 16 is a partial cutaway perspective view of the adjustment coupler of FIG. 6 in an unlocked configuration.
Figure 17:
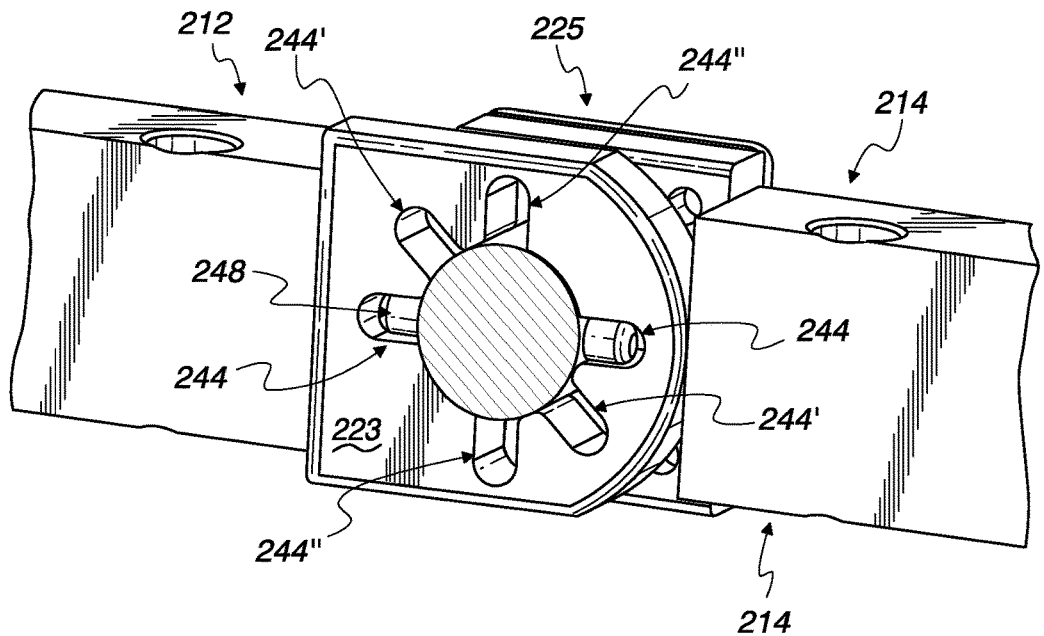
FIG. 17 is another partial cutaway perspective view of the adjustment coupler of FIG. 6 in a locked configuration.
Figure 18:
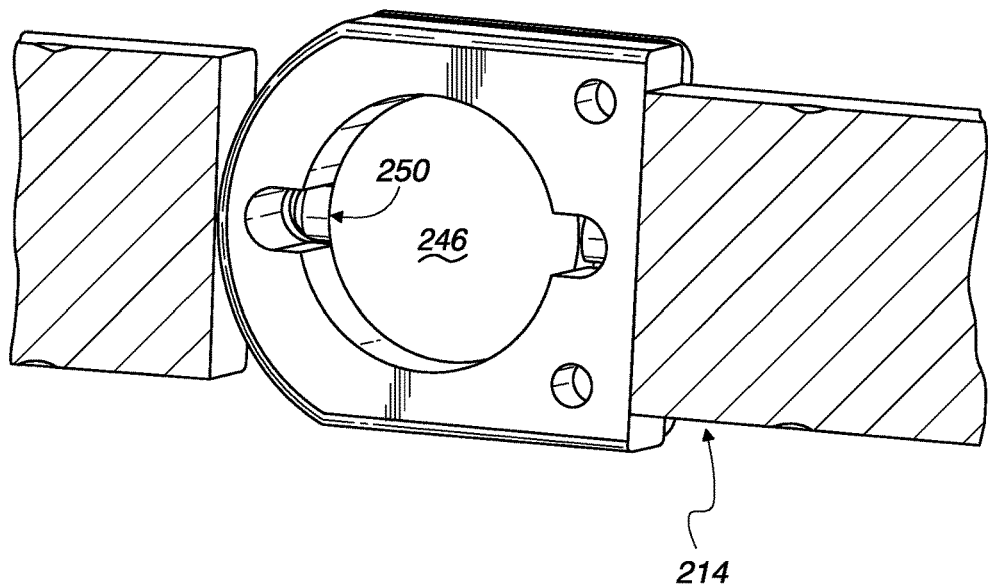
FIG. 18 is yet another partial cutaway perspective view of the adjustment coupler of FIG. 6 in a locked configuration.

As best shown in FIGS. 6A and 13, the second tab 225 defines an aperture having a generally cylindrical central portion 227 and a keyway 229 extending outwardly from the central portion. The keyway 229 may be configured in a manner the same as or similar to the keyway 231' of the first tab 223. The central portion 227 is configured to selectively receive a portion of the pushbutton 246 and the keyway 229 is configured to selectively receive corresponding keys 248 and 250 extending from the pushbutton 246, as will be discussed further below.

As shown, the pushbutton 246 is in the form of a stepped cylinder including a first portion or shank 256 having a first diameter and a coaxial second portion or head 258 having a second diameter greater than the first diameter. As shown, a first key 248 extends outwardly from the shank 256. The first key 248 is configured to be selectively received within the corresponding keyways 244, 244', 244", 231'. As shown, the first key 248 is embodied as a first pin received within a corresponding first aperture formed diametrically through the head 258 of the pushbutton 246. A second key 250 extends outwardly from the head 258 of the pushbutton 246. The second key 250 is configured to be selectively received within the corresponding keyway 229. As shown, the second key 250 is embodied as a second pin received within a corresponding second aperture formed diametrically through the head 258 of the pushbutton 246. In other embodiments, the first key 248 and the second key 250 could be formed in different ways and configured in different ways complementary to the configuration of the corresponding keyways 244, 244', 244", 231'. For example, either or both of the first key 248 and the second key 250 could be configured as a plurality of pins, each extending from a corresponding aperture defined by the pushbutton 246. Alternatively, either or both of the first key 248 and the second key 250 could be integrally formed with the pushbutton 246.

In an embodiment, the pushbutton 246 could take the form of a cylinder having a substantially constant diameter. In such an embodiment, the first key 248 and the second key 250 could extend radially from respective portions of the cylinder.

A retainer 260 is attached to the outer face of the second tab 225 using screws 264. The screws 264 include threaded portions disposed through corresponding through holes in the retainer 260 and into corresponding threaded holes in the second tab 225. The inner surface of the retainer 260 includes a keyway 262 configured to selectively receive a portion of the second key 250.

A cap 266 is attached to the outer face of the first tab 223 using screws 268. The screws 268 include threaded portions disposed through corresponding through holes in the cap 266 and into corresponding threaded holes in the first tab 223.

The coupler 210 may be assembled and operated as follows. The tab 224 of the first clutch member 212 may be inserted into the slot defined by the first and second tabs 223, 225 of the second clutch member 214 so that the central portion 242 of the aperture 240 in the tab 224 of the first clutch member is coaxial with the central portion 227 of the aperture in the second tab 225 of the second clutch member. The pins defining the first and second keys 248, 250 may be inserted through the corresponding first and second apertures in the pushbutton 246. The shank 256 of the pushbutton 246 may be inserted through the central portion 227 of the aperture in the second tab 225. The first key 248 may be inserted through the keyway 229 of the aperture in the second tab 225. With one of the keyways 244, 244', 244" of the tab 222 of the first clutch member 212 aligned with the first key 248, the shank 256 of the pushbutton and the first key 248 may be inserted into or through the aperture 240 in the first tab 223 of the second clutch member 214. The retainer 260 may be assembled to the second tab 225 using the screws 264. The spring 254 may be inserted through the aperture 252 in the first tab 223. An end of the spring 254 may bear against the interior end face (the end face adjacent the shank 256) of the pushbutton 246. The cap 266 may be attached to the outer face of the first tab 223 using the screws 268. Another end of the spring 254 may bear against an interior face of the cap 266.

In use, the spring 254 biases the pushbutton 246 away from the cap 266, thereby biasing a portion of the second key 250 into the keyway 262 formed in the inner face of the retainer 260. With the pushbutton 246 in this orientation, substantially the balance of the second key 250 may be captured by the keyway 229 of the aperture in the second tab 225. With the second pin 250 in this orientation, the pushbutton 246 is not free to rotate with respect to the second tab 225. Also, with the pushbutton in this orientation, the first key 248 is engaged with a respective pair of keyways 244, 244', 244" in the tab 224 of the first clutch member 212. As such, the first clutch member 212 is not free to rotate (or is locked) with respect to the second clutch member 214. This orientation is shown, for example, in FIG. 15.

The orientation of the first clutch member 212 with respect to the second clutch member 214 may be changed by depressing the pushbutton 246 until the first key 248 disengages from one of the keyways 244, 244', 244" it may be engaged with. For example, depressing the pushbutton 246 may displace the first key 248 into the keyway 231' of the relief 230 in the first tab 223 of the second clutch member 214. With the first key 248 disengaged from the keyways 244, 244', 244", the first clutch member 212 may be rotated (or is unlocked) with respect to second clutch member 214. The pushbutton 246 may be released once such rotation has begun. Once the first clutch member 212 has rotated through a sufficient arc with respect to the second clutch member 214, the first key 248 will become aligned with another keyway 244, 244', 244", and the spring 254 will bias the pushbutton 246 axially so that the first key 248 becomes engaged with such keyway 244, 244', 244", thereby locking the first clutch member 212 with respect to the second clutch member. This orientation is shown, for example, in FIG. 16.

The foregoing embodiments are illustrative and should not be deemed to limit the scope of the invention define by the appended claims. Features shown in one embodiment may be incorporated in other embodiments to the extent possible.

The invention claimed is:

1. A clutch mechanism comprising:
a first clutch member comprising:
    a first tab, said first tab defining a first aperture, said first aperture comprising a central portion, a first keyway extending radially from said central portion, and a second keyway extending radially from said central portion;
a second clutch member comprising:
    a second tab defining a second aperture, said second aperture comprising a central portion and a third keyway extending radially from said central portion; and
    a third tab defining a third aperture, said third aperture comprising a central portion and a fourth keyway extending radially from said central portion;
    said third tab parallel to and spaced from said second tab such that said third aperture is coaxial with said second aperture and said fourth keyway is aligned with said third keyway;
wherein said first tab is received between said second tab and said third tab such that said central portion of said first aperture is coaxial with said central portions of said second aperture and said third aperture and such that each of said third and fourth keyways are selectively alignable with said first keyway in a first configuration and selectively alignable with said second keyway in a second configuration; and
a locking member in sliding engagement with said central portions of each of said first, second, and third tabs, said locking member slidable between a first position and a second position, said locking member comprising:
    a first key configured for selective engagement with said first keyway and said second keyway, said first key engaged with said first keyway or said second keyway when said locking member is in said first position but not keyed to said first keyway or said second keyway when said locking member is in said second position; and
    a second key keyed to said fourth keyway when said locking member is in either of said first and second positions.

2. The clutch mechanism of claim 1 further comprising a biasing mechanism biasing said locking member toward said first position.

3. The clutch mechanism of claim 2, said biasing mechanism comprising a spring acting against an end of said locking member.

4. The clutch mechanism of claim 3 further comprising a bearing surface associated with said second tab, said spring further acting against said bearing surface.

5. The clutch mechanism of claim 4, said bearing surface comprising a cap attached to said second tab.

6. The clutch mechanism of claim 1, said first key received within said third keyway when said locking member is in said second position.

7. The clutch mechanism of claim 6, said first key absent from said first keyway and said second keyway when said locking member is in said second position.

8. The clutch mechanism of claim 1 further comprising a retainer attached to said third tab, said second key keyed to said retainer when said locking member is in said first position.

9. The clutch mechanism of claim 1, said locking member comprising a stepped cylinder having a shank and a head.

10. The clutch mechanism of claim 9, said first key comprising at least one first pin extending radially from said shank.

11. The clutch mechanism of claim 10, said first key comprising at least one first pin extending radially from diametrically opposed portions of said shank.

12. The clutch mechanism of claim 10, said second key comprising at least one second pin extending radially from said head.

13. The clutch mechanism of claim 1, said locking member comprising a cylinder.

14. The clutch mechanism of claim 13, said first key comprising at least one first pin extending radially from said cylinder and said second key comprising at least one second pin extending radially from said cylinder.

15. The clutch mechanism of claim 1, said first tab of said first clutch member further comprising a third keyway extending radially from said central portion.

16. A support arm for an awning comprising:
a first support arm section;
a second support arm section; and
a clutch mechanism as recited in claim 1, said first clutch member connected to said first support arm section, and said second clutch member connected to said second support arm section.

17. The support arm of claim 16, said first clutch member comprising a first shank received within an end of said first support arm section.

18. The support arm of claim 17, said second clutch member comprising a second shank received within an end of said second support arm section.

* * * * *